(12) United States Patent
Schubert et al.

(10) Patent No.: US 8,091,043 B2
(45) Date of Patent: Jan. 3, 2012

(54) MODELING ENVIRONMENT GRAPHICAL USER INTERFACE

(75) Inventors: Harald Schubert, Mannheim (DE); Christian Brand, Dudenhofen (DE); Ingo Koch, Mannheim (DE); Matthias Gorning, Dussenheim (DE); Reiner Hille-Doering, Karlsruhe (DE)

(73) Assignee: SAP AG, Walldorf (DE)

( * ) Notice: Subject to any disclaimer, the term of this patent is extended or adjusted under 35 U.S.C. 154(b) by 1148 days.

(21) Appl. No.: 11/853,702

(22) Filed: Sep. 11, 2007

(65) Prior Publication Data

US 2009/0070712 A1    Mar. 12, 2009

(51) Int. Cl.
*G06F 3/048* (2006.01)

(52) U.S. Cl. .................... 715/840; 715/808; 715/810

(58) Field of Classification Search .............. 715/840, 715/810, 808
See application file for complete search history.

(56) References Cited

U.S. PATENT DOCUMENTS

| | | | | |
|---|---|---|---|---|
| 5,546,519 A | * | 8/1996 | Berry | 715/763 |
| 5,634,095 A | * | 5/1997 | Wang et al. | 715/763 |
| 5,821,937 A | * | 10/1998 | Tonelli et al. | 715/853 |
| 6,112,024 A | * | 8/2000 | Almond et al. | 717/122 |
| 2003/0182308 A1 | * | 9/2003 | Ernst et al. | 707/103 Z |
| 2005/0096872 A1 | * | 5/2005 | Blevins et al. | 702/183 |

* cited by examiner

*Primary Examiner* — William Bashore
*Assistant Examiner* — Gregory A Distefano
(74) *Attorney, Agent, or Firm* — Mintz, Levin, Cohn, Ferris, Glovsky and Popeo, P.C.

(57) ABSTRACT

A first element in a graphical modeling environment is selected by a user which results in a plurality of speed buttons adjacent to the first element being displayed. Such speed buttons define operations to be conducted on the first element in connection with a second element. After one of the displayed speed buttons is selected, it can be dragged to a display point. A second element is generated at the display point based on the selected displayed speed button which is linked to the first element. The link can be characterized by the operations defined by the selected displayed speed button. Related techniques, apparatus, systems, and products are also described.

20 Claims, 5 Drawing Sheets

400

500

MODELING ENVIRONMENT GRAPHICAL USER INTERFACE

TECHNICAL FIELD

The subject matter described herein relates to a graphical user interface for a modeling environment.

BACKGROUND

In graphical modeling environments such as SAP Netweaver Development Studio (which is an integrated environment for the development of J2EE-based, multi-tiered business applications that is based on open-source Eclipse, providing an open and extensible development environment using Java and Web services) or Microsoft Visio (diagramming software that uses vector graphics), or the like, a user can link or otherwise associate various modeling components together. The types of links can be defined or modified after such components are linked. Conventional techniques for defining links require user to right click the links and/or access different menus in order define such a link. Such actions can be cumbersome and decrease productivity, especially in large scale models.

SUMMARY

In one aspect, first user-generated input selecting (e.g., clicking, hovering over, etc.) a first element in a graphical modeling environment is received. In response to this selection, a plurality of speed buttons adjacent to the first element are displayed. The speed buttons define operations to be conducted on the first element in connection with a second element. Thereafter, second user-generated input selecting one of the displayed speed buttons and dragging the selected displayed speed button to a display point is received. In response to this action, a second element is displayed at the display point based on the selected displayed speed button with the second element being linked to the first element and the link being characterized by the operations defined by the selected displayed speed button.

In some variations, a context menu can be displayed adjacent to the display point with the context menu including two or more element definitions. Further user-generated input can also be received selecting one of the element definitions in the context menu to characterize the second element. In addition or in the alternative, user-generated input can be received that drags a third element from a palette onto the link. A plurality of speed buttons can be displayed adjacent to the third element, the speed buttons defining operations to be conducted on the third element in connection with one or more of the first element and the second element. The palette can comprise a plurality of icons characterizing modeling elements and operations.

If multiple elements are selected, then speed buttons can be displayed adjacent to each selected element. Such speed buttons can define, for example, how the respective selected components can be linked.

In an interrelated aspect, first user-generated input selecting a first element in a graphical modeling environment is received. Additionally, second user-generated input selecting a second element is received as well as third user-generated input initiating a link between the first element and the second element. In response, a context menu containing two or more element definitions can be displayed adjacent to the second element. Selection of one of the element definitions in the context menu causes a link between the first and second element to be generated with the link being characterized by the operations defined by the selected displayed speed button and the selected element definition.

In a further interrelated aspect, first user-generated input selecting a first element in a graphical modeling environment is received as well as second user-generated input dragging the first element on to a first link between a second element and a third element. In response, a plurality of speed buttons are displayed adjacent to the first element, the speed buttons defining operations to be conducted on the first element in connection with a first portion of the first link associated with the second element and a second portion of the first link associated with the third element. When third user-generated input selecting one of the displayed speed buttons for the first portion of the first link and selecting one of the displayed speed buttons for the second portion of the first link is received, a second link is generated between the first and second elements, the link being characterized by the operations defined by the selected displayed speed button for the first portion of the first link, and a third link is generated between the first and third elements, the link being characterized by the operations defined by the selected displayed speed button for the second portion of the first link.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by providing speed buttons and/or context menus, the process of graphical modeling can be shortened which can have a significant impact in large scale models.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
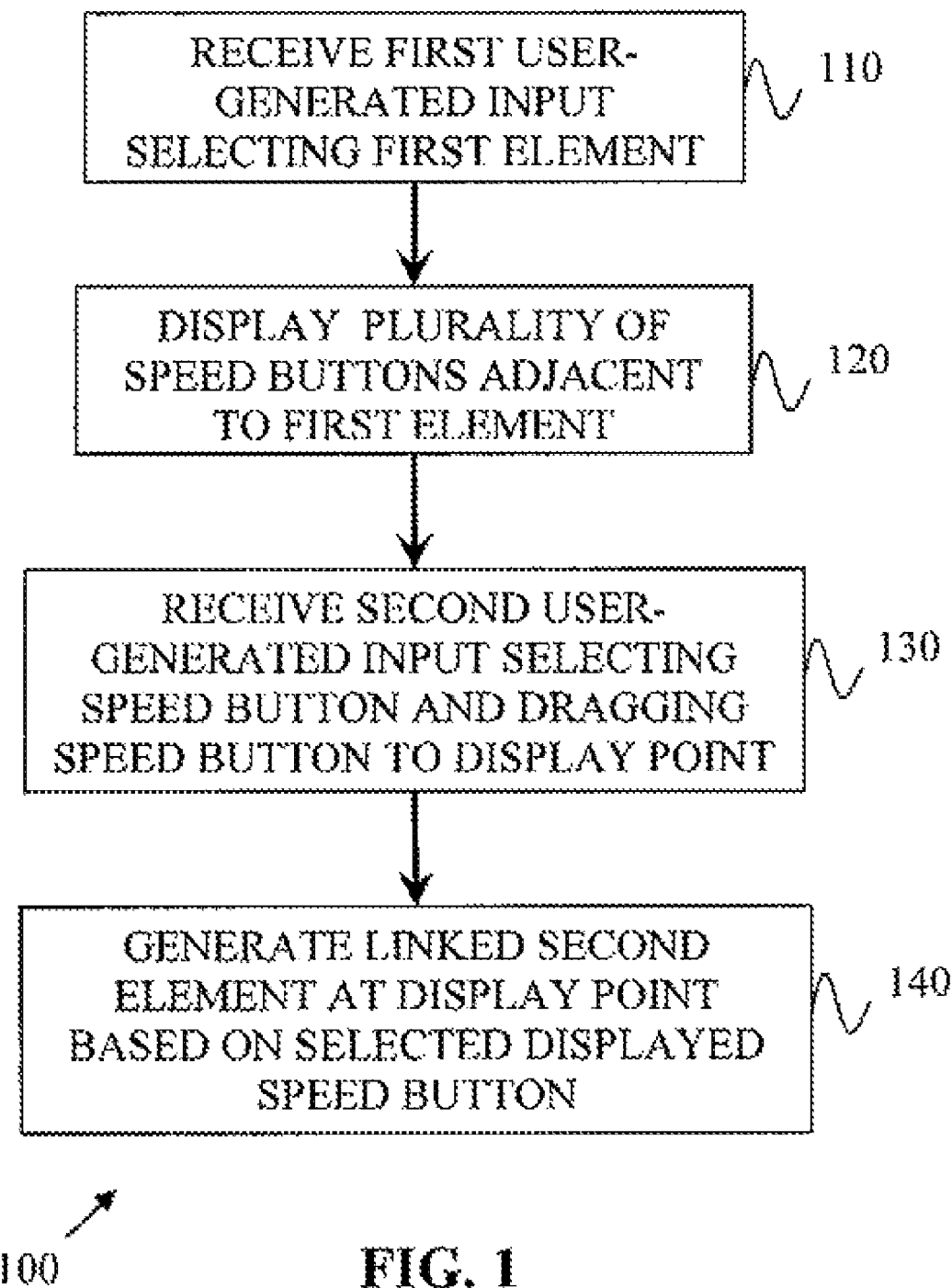
FIG. 1 is a first process flow diagram illustrating graphical user interface techniques in a modeling environment.

FIG. 1 is a process flow diagram illustrating a method 100, in which, at 110, first user generated input selecting a first element in a graphical modeling environment (e.g., SAP NetWeaver Development Studio SAP Visual Composer, Microsoft Visio, Autodesk AutoCAD, etc.) is received. Thereafter, at 120, a plurality of speed buttons adjacent to the first element are displayed. Such speed buttons can define operations to be conducted on the first element in connection with a second element. After the speed buttons are displayed, at 130, second user-generated input selecting one of the displayed speed buttons and dragging the selected displayed speed button to a display point is received. At 140, a second element is generated at the display point based on the selected displayed speed button. This second element is linked to the first element. Such link is characterized by the operations defined by the selected displayed speed button.

In some variations, a context menu can be displayed adjacent to the display point that includes two or more element definitions. Selection of one of these element definitions allows for the characterization of the second element prior to its generation.

Figure 2:
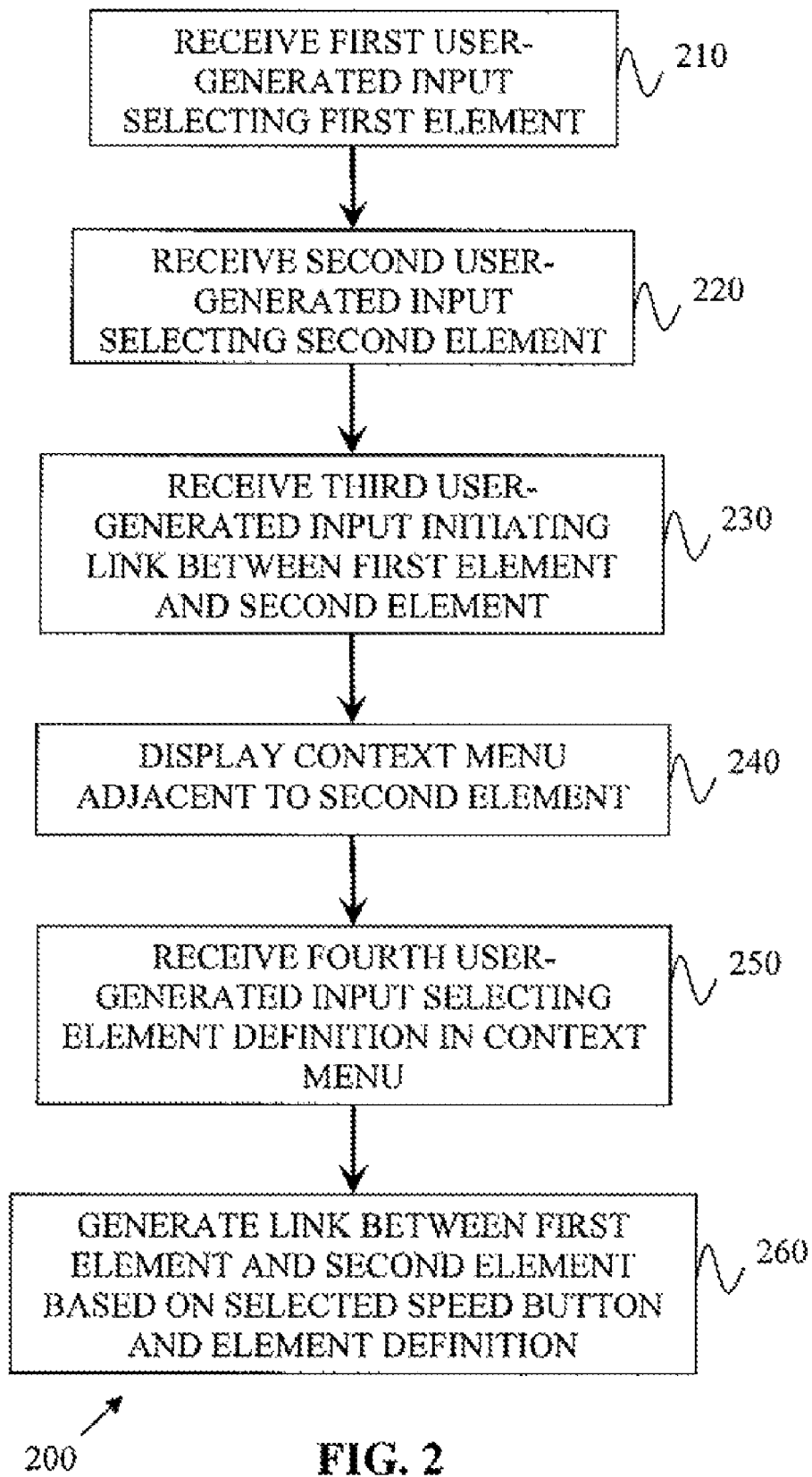
FIG. 2 is a second process flow diagram illustrating graphical user interface techniques in a modeling environment.

FIG. 2 is a process flow diagram illustrating a method 200, in which, at 210, first user-generated input selecting a first element in a graphical modeling environment is received. Subsequently, at 220, second user-generated input that selects a second element is received followed by, at 230, third user-generated input initiating a link between, the first element and the second element being received. A context menu containing two or more element definitions is displayed, at 240, adjacent to the second element. After the context menu is displayed, at 250, fourth user-generated input selecting one of the element definitions in the context menu is received. A link between the first and second element is generated, at 260. Thus link is characterized by the operations defined by the selected displayed speed button and the selected element definition.

Figure 3:
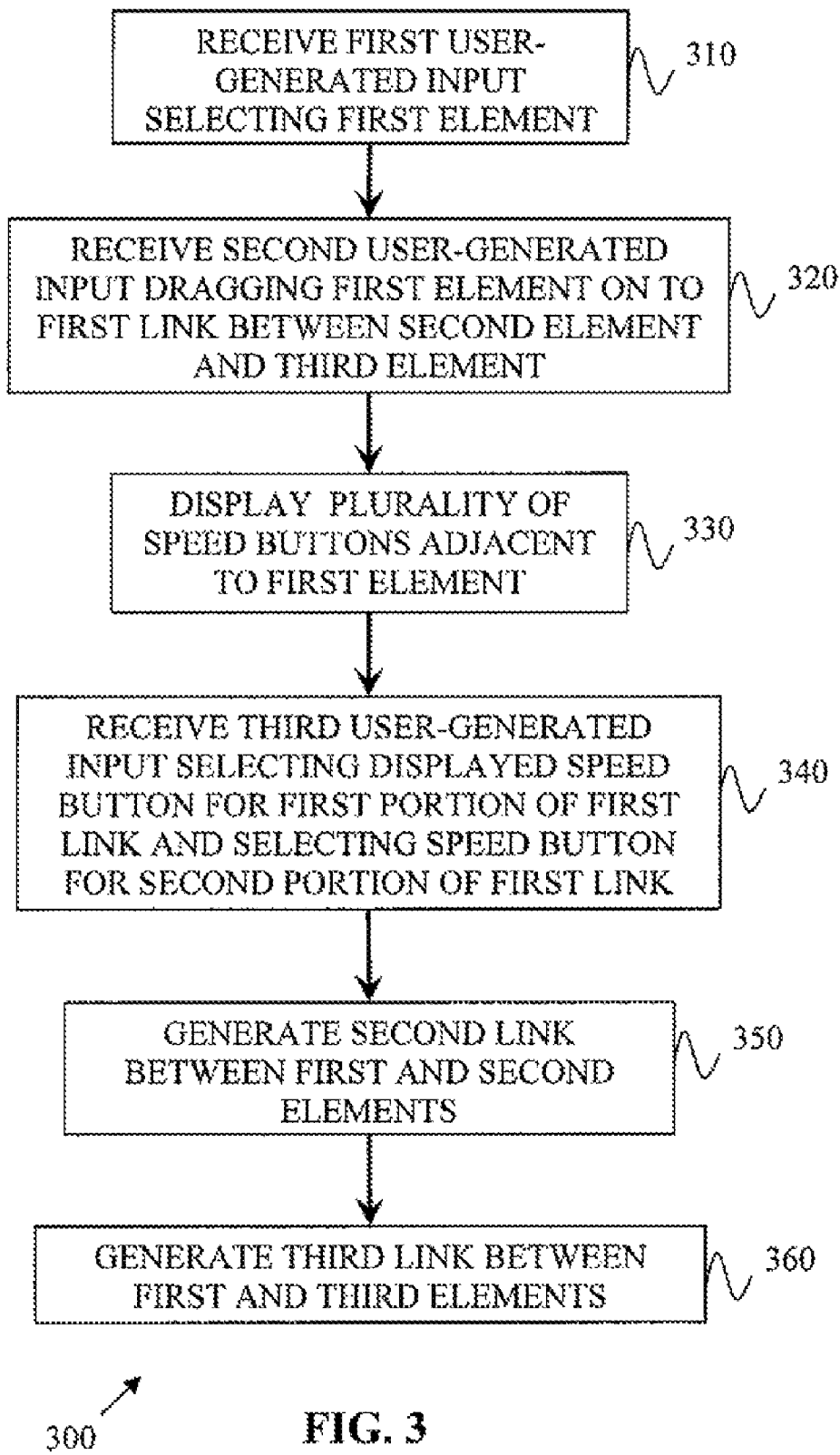
FIG. 3 is a third process flow diagram illustrating graphical user interface techniques in a modeling environment.

FIG. 3 is a process flow diagram illustrating a method 300, in which, at 310, first user-generated input selecting a first element in a graphical modeling environment is received. Thereafter, at 320, second user-generated input dragging the first element on to a first link between a second element and a third element is received. A plurality of speed buttons can then be displayed, at 330, adjacent to the first element. Such speed buttons can define operations to be conducted on the first element in connection with a first portion of the first link associated with the second element and a second portion of the first link associated with the third element. Subsequently, at 340, third user-generated input selecting one of the displayed speed buttons for the first portion of the first link and selecting one of the displayed speed buttons for the second portion of the first link is received. A second link is generated, at 350, between the first and second elements, the link being characterized by the operations defined by the selected displayed speed button for the first portion of the first link. A third link is generated, at 360, between the first and third elements, the link being characterized by the operations defined by the selected displayed speed button for the second portion of the first link.

Figure 4:
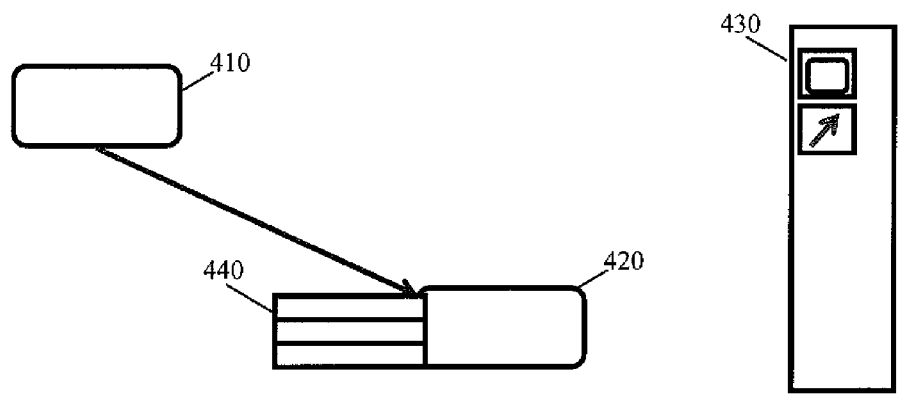
FIG. 4 is a rendering of a graphical modeling user interface illustrating a context menu disposed adjacent to a modeling element.

FIG. 4 is a diagram illustrating a modeling environment interface 400 in which a user clicks on a button within a palette 430 relating to a linking tool. The user can then click on a first component 410 which results in a link between the first component and the pointer (e.g., arrow, etc.). When the pointer is hovered over a second component 420, a visual indication will be presented which indicates whether or not the first component 410 can be linked to the second component 420. Assuming that the two components can indeed be linked, clicking on the second component 420 results in it being linked to the first component 410. If there is only one manner in which the two components can be linked, then the first component 410 is linked to the second component 420 in that manner. If there are several manners in which the two components can be linked, a context menu 440 can be displayed adjacent or overlaid on the second component 420 (or where the user has activated the pointer) which includes different types of linking mechanisms. Selection of one of these linking types on the context menu 440 causes the first component 410 to be linked to the second component 420 via the selected linking type.

Figure 5:
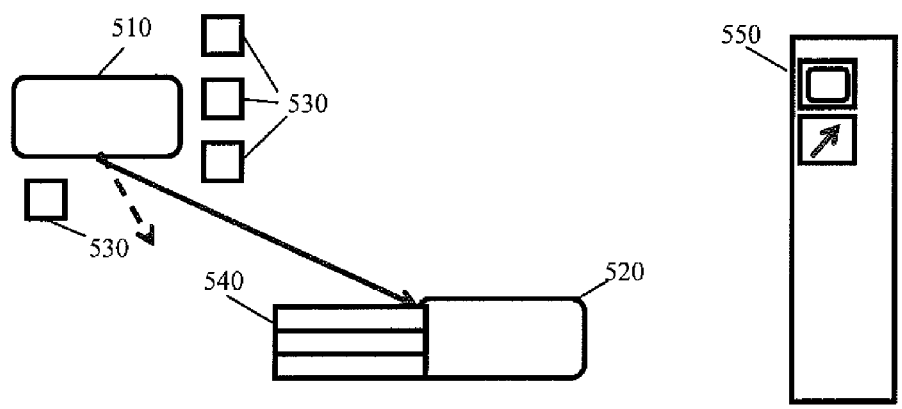
FIG. 5 is a rendering of a graphical modeling user interface illustrating speed buttons adjacent to a first modeling element and a context menu disposed adjacent to a second modeling element.

FIG. 5 is a diagram illustrating a modeling environment interface 500 in which a user hovers over or clicks on the first component 510 which results in a series of speed buttons 530 being displayed adjacent to the first component 510. A user can select one of the speed buttons 530 and drag the pointer (by depressing the pointer button) over the canvas of the modeling environment resulting in a dummy link connecting the pointer to the first component 510. Hovering the pointer over a second component 520 will result in a visual depiction indicating whether the second component 520 is a valid target. If it is a valid target, clicking the pointer over the second component 520 will result in it being linked to the first component 510. If there is only one way that these two components can be linked, they will be linked in such manner. However, if there are several ways in which the two components can be linked, then a context menu 540 including various linking mechanisms can be displayed so that a user can select one of the linking mechanisms in the context menu 540 to define the link between the first component 510 and the second component 520. A palette 550 can also be utilized to select a linking tool in lieu of the speed buttons 530 and/or the context menu 550.

In one variation, when a user hovers the pointer (or activates the pointer) over the first component 510, the speed buttons 530 are rendered adjacent to the first component 510. After a drag (e.g., mousedown etc.) on a desired speed button 530, a dummy connection appears between the first component 510 and the pointer. If the pointer is moved to a different location on the canvas, the dummy connection with follow the pointer. After a drop (e.g., mouseup, etc.) on the canvas, the second component 520 is created that is connected to the first component 510 (with the type of component and/or the type of connection being optionally based on the selected speed button 530). Additionally, if additional input is required from the user, the context menu 540 can be displayed which allows the user to choose a connection type and/or type of component. Selection of an entry on the context menu causes the second component 520 to be created adjacent to the first component 510 and connected with a link defined by the selected context menu 540 entry and/or the selected speed button 540.

Figure 6:
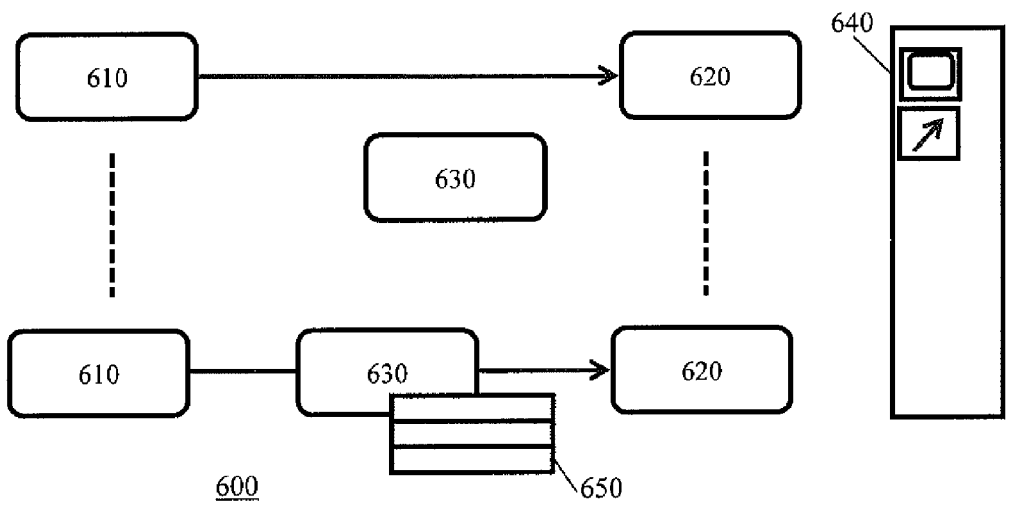
FIG. 6 is a rendering of a graphical modeling user interface illustrating a user dragging a first component onto a link between a second component and a third component.

FIG. 6 is a diagram illustrating a modeling environment interface 600 in which a first component 610 is linked to a second component 620 on a canvas having a palette 640. A user selects a third component 630 and drags it (using the pointer) on top of the link between the first component 610 and the second component 620. A graphical indication may be displayed identifying whether the connection between the first component 610 and the second component 620 may be split. If the connection can be split, the third component 630 will be linked to the first component 610 and the second component 620 and the link between the first component 610 and the second component 620 will be removed. A context menu 650 may be displayed adjacent to the third component 630 that can allow the user to select, for example, a type for the third component 630 and/or to define the linking mechanisms between the third component 630 and each of the first component 610 and the second component 620.

In some variations, an item in the palette 640 can be selected to generate a new component. This new component may be initially rendered on the canvas, or it can be generated by dragging the pointer from the palette 640. If the new component is dragged onto a pre-existing link between two components, the process can proceed in a fashion similar to that described above in connection with the third component 630.

Figure 7:
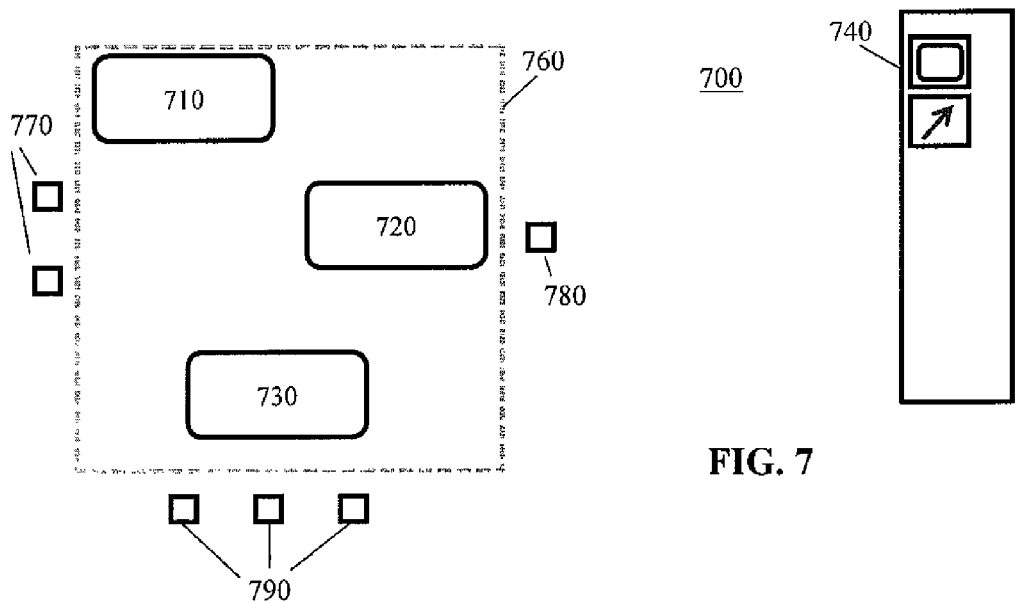
FIG. 7 is a rendering of a graphical modeling user interface illustrating a selection of multiple components and a display of speed button adjacent to such components.

FIG. 7 is a diagram illustrating a modeling environment interface 700 in which there is a first component 710, a second component 720, and a third component 730 on a canvas having a palette 740. A rectangle 750 may be illustrated surrounding each of the first component 710, second component 720, and third component 730 indicating that each of such components were selected. When multiple components are selected, each of the components may contain speed buttons 760, 770, 780 adjacent thereto which defines how the respective component may be linked to the other components. In some implementations, common actions can be simultaneously executed for all of the selected components.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:
   receiving first user-generated input selecting a first element in a graphical modeling environment;
   displaying a plurality of speed buttons adjacent to the first element, the speed buttons defining operations to be conducted on the first element in connection with a second element;
   receiving second user-generated input selecting one of the displayed speed buttons and dragging the selected displayed speed button to a display point; and
   generating a second element at the display point based on the selected displayed speed button, the second element being linked to the first element, the link being characterized by the operations defined by the selected displayed speed button.

2. An article as in claim 1 further operable to cause one or more machines to result in operations comprising:
   displaying a context menu adjacent to the display point, the context menu including two or more element definitions; and
   receiving third user-generated input selecting one of the element definitions in the context menu to characterize the second element.

3. An article as in claim 2 further operable to cause one or more machines to result in operations comprising:
   receiving fourth user-generated input dragging a third element from a palette onto the link.

4. An article as in claim 3 further operable to cause one or more machines to result in operations comprising:
   displaying a plurality of speed buttons adjacent to the third element, the speed buttons defining operations to be conducted on the third element in connection with one or more of the first element and the second element.

5. An article as in claim 3 further operable to cause one or more machines to result in operations comprising:
   displaying a plurality of speed buttons adjacent to the third element, the speed buttons characterizing a type for the third element.

6. An article as in claim 3 wherein the palette comprises a plurality of icons characterizing modeling elements and operations.

7. An article as in claim 1, wherein multiple elements are selected and speed buttons are displayed adjacent to each selected element.

8. An article as in claim 1 further operable to cause one or more machines to result in operations comprising:

displaying a dummy connection between the first element and a pointer prior to dragging the speed button to the display point.

9. A method comprising:
receiving first user-generated input selecting a first element in a graphical modeling environment;
displaying a plurality of speed buttons adjacent to the first element, the speed buttons defining operations to be conducted on the first element in connection with a second element;
receiving second user-generated input selecting one of the displayed speed buttons and dragging the selected displayed speed button to a display point; and
generating a second element at the display point based on the selected displayed speed button, the second element being linked to the first element, the link being characterized by the operations defined by the selected displayed speed button.

10. A method as in claim 9 further comprising:
displaying a context menu adjacent to the display point, the context menu including two or more element definitions; and
receiving third user-generated input selecting one of the element definitions in the context menu to characterize the second element.

11. A method as in claim 10 further comprising:
receiving fourth user-generated input dragging a third element from a palette onto the link.

12. A method as in claim 11 further comprising:
displaying a plurality of speed buttons adjacent to the third element, the speed buttons defining operations to be conducted on the third element in connection with one or more of the first element and the second element.

13. A method as in claim 11 further comprising:
displaying a plurality of speed buttons adjacent to the third element, the speed buttons characterizing a type for the third element.

14. A method as in claim 11, wherein the palette comprises a plurality of icons characterizing modeling elements and operations.

15. A method as in claim 9, wherein multiple elements are selected and speed buttons are displayed adjacent to each selected element.

16. A method as in claim 9, further comprising: displaying a dummy connection between the first element and a pointer prior to dragging the speed button to the display point.

17. An article comprising a non-transitory machine-readable medium embodying instructions that when performed by one or more machines result in operations comprising:
receiving first user-generated input selecting a first element in a graphical modeling environment;
receiving second user-generated input dragging the first element on to a first link between a second element and a third element;
displaying a plurality of speed buttons adjacent to the first element, the speed buttons defining operations to be conducted on the first element in connection with a first portion of the first link associated with the second element and a second portion of the first link associated with the third element;
receiving third user-generated input selecting one of the displayed speed buttons for the first portion of the first link and selecting one of the displayed speed buttons for the second portion of the first link;
generating a second link between the first and second elements, the link being characterized by the operations defined by the selected displayed speed button for the first portion of the first link; and
generating a third link between the first and third elements, the link being characterized by the operations defined by the selected displayed speed button for the second portion of the first link.

18. An article as in claim 17 further operable to cause one or more machines to result in operations comprising:
displaying a context menu adjacent to the first element after it is dragged on to the link between the first element and the second element.

19. A system comprising:
means for receiving first user-generated input selecting a first element in a graphical modeling environment;
means for displaying a plurality of speed buttons adjacent to the first element, the speed buttons defining operations to be conducted on the first element in connection with a second element;
means for receiving second user-generated input selecting one of the displayed speed buttons and dragging the selected displayed speed button to a display point; and
means for generating a second element at the display point based on the selected displayed speed button, the second element being linked to the first element, the link being characterized by the operations defined by the selected displayed speed button.

20. A method comprising:
receiving first user-generated input selecting a first element in a graphical modeling environment;
receiving second user-generated input dragging the first element on to a first link between a second element and a third element;
displaying a plurality of speed buttons adjacent to the first element, the speed buttons defining operations to be conducted on the first element in connection with a first portion of the first link associated with the second element and a second portion of the first link associated with the third element;
receiving third user-generated input selecting one of the displayed speed buttons for the first portion of the first link and selecting one of the displayed speed buttons for the second portion of the first link;
generating a second link between the first and second elements, the link being characterized by the operations defined by the selected displayed speed button for the first portion of the first link; and
generating a third link between the first and third elements, the link being characterized by the operations defined by the selected displayed speed button for the second portion of the first link.

* * * * *